United States Patent [19]

Columbus

[11] Patent Number: 4,957,582

[45] Date of Patent: Sep. 18, 1990

[54] CAPILLARY TRANSPORT ZONE COATED WITH ADHESIVE

[75] Inventor: Richard L. Columbus, Rochester, N.Y.

[73] Assignee: Eastman Kodak Company, Rochester, N.Y.

[21] Appl. No.: 324,140

[22] Filed: Mar. 16, 1989

[51] Int. Cl.[5] .................... C09J 5/00

[52] U.S. Cl. .................... 156/332; 73/53; 73/864.91; 128/760; 156/278; 156/292; 204/403; 204/416; 422/100; 436/180

[58] Field of Search .................... 156/278, 332, 292; 422/100; 436/180; 128/760; 73/864.91, 53; 204/403, 416

[56] References Cited

U.S. PATENT DOCUMENTS

| | | | |
|---|---|---|---|
| 3,198,064 | 8/1965 | Moore | 73/864.91 |
| 4,233,029 | 11/1980 | Columbus . | |
| 4,271,119 | 6/1981 | Columbus | 204/416 |
| 4,310,399 | 1/1982 | Columbus . | |
| 4,473,457 | 9/1984 | Columbus | 204/416 |
| 4,549,952 | 10/1985 | Columbus . | |

*Primary Examiner*—John J. Gallagher
*Attorney, Agent, or Firm*—Dana M. Schmidt

[57] ABSTRACT

A device for liquid transport, and a method of making it, are described. The device features a capillary transport zone comprising opposing sufaces formed from supporting material having unsatisfactory wettability. The wettability is improved by applying a coating of an adhesive.

12 Claims, 2 Drawing Sheets

CAPILLARY TRANSPORT ZONE COATED WITH ADHESIVE

FIELD OF THE INVENTION

This invention is directed to a device and a method of making it, wherein the wettability of the surface of a liquid transport device is controlled by a coating applied thereto.

BACKGROUND OF THE INVENTION

Capillary transport zones have been provided to convey (drops of patient sample along a path to a test area such as is provided by an ion-selective electrode,) and/or to a drop of reference liquid to form, e.g., an electrically conductive interface. Examples are shown in U.S. Pat. Nos. 4,233,029 and in 4,310,399. In the first of these, the opposing surfaces that are spaced apart a capillary distance are held together, with such a spacing, by means of adhesive, column 11, lines 1-6. In the second of these two, the surfaces are said to be joined with their capillary spacing, by the use of ultrasonic bonding. To permit such bonding, plastics are preferred.

Highly preferred plastics are those that are readily manufacturable and provide adequate support when used in a test element containing such a capillary transport zone. The problem has been that the material of choice, relative to these manufacturing considerations, is polystyrene, which has a serious disadvantage: it is not readily wetted by the patient samples of choice. Thus, polystyrene typically forms a high equilibrium contact angle with water and serum, specifically, 87° and 83°, respectively, for a typical polystyrene. Such poor wettability tends to make the flow behavior of patient sample through the transport zone, erratic and unpredictable. Although geometric surfaces on the polystyrene can be used to overcome such erratic behavior, a more convenient construction of the transport zone would be one in which the surface is inherently more wettable. In such a case, the need for geometric surface designs would be avoided. Prior to this invention, it has been difficult to find a plastic that is both more wettable and has the manufacturability of plastics like polystyrene.

Although wetting agents have been applied to the polystyrene in an effort to solve the wettability problem, these agents in turn tend to have the disadvantage of interacting with the patient sample in one way or another. For example, a physical interaction of swelling occurs when using gelatin as the wetting agent as described in my U.S. Pat. No. 4,549,952 issued Oct. 29, 1985. This swelling has an advantageous function of increasing the viscosity of the flowing liquid, as noted in the patent. However, it also requires careful spacing tolerances, lest the gelatin swell to the point of preventing necessary liquid flow, e.g., as described in column 7, lines 11-16.

SUMMARY OF THE INVENTION

I have discovered a wetting agent that solves the wettability problem of the polystyrene, while remaining inert to the patient sample. Furthermore, the wetting agent has the fortuitous property of being an adhesive for the bonding together of plastic parts used to form the transport zone. As such, it can be coated in a single pass to provide both the joining function and the wetting function.

More specifically, in accord with one aspect of this invention there is provided a device providing a liquid transport zone for moving liquid along a path by capillary attraction, the zone comprising two opposing surfaces joined together so as to provide a capillary spacing between the surfaces, the surfaces comprising a supporting material having an equilibrium contact angle with serum that is greater than about 80° or less than about 30°. The device is improved in that at least one of the opposing surfaces is coated in at least a portion of the transport zone with an adhesive capable of bonding together the supporting material of the surfaces, the adhesive, when cured, having an equilibrium contact angle with serum that is less than about 80° and greater than about 30°.

In accord with another aspect of the invention, there is provided a method of making a device containing a liquid transport zone capable of transporting patient sample through the zone via capillary action, the zone comprising opposing surfaces joined together so as to provide a capillary spacing between the surfaces, the surfaces comprising a supporting material having an equilibrium contact angle with serum that is greater than about 80° or less than 30°. The method comprises the steps of (a) providing the supporting material configured with the opposing surfaces; (b) coating at least a portion of the supporting material of at least one of the opposing surfaces with an adhesive capable of bonding together the supporting material, the adhesive, when dry, having an equilibrium contact angle with serum that is less than about 80° and greater than about 30°, some of the adhesive being applied in at least a portion of the area of the transport zone; (c) joining the supporting materials; and (d) curing the adhesive.

Thus, it is an advantageous feature of the invention that a readily manufacturable plastic having an equilibrium contact angle with serum that is greater than about 80°, can be used to manufacture liquid transport devices without sacrificing surface wettability properties and without requiring the use of a coating whose swelling properties requires careful maintenance of tolerances.

It is a related advantageous feature of the invention that such a liquid transport device can be manufactured without always requiring complicated geometric surface designs to aid in control of liquid flow.

It is another advantageous feature of the invention that such a liquid transport device can be manufactured from such plastics without requiring coating steps that are separate and distinct from the steps already used in the manufacture.

Other advantageous features will become apparent upon reference to the following detailed description, when read in light of the attached drawings.

DESCRIPTION OF THE PREFERRED EMBODIMENTS

The invention is described in connection with its use with a preferred liquid transport device, namely, an ion-selective test element useful in clinical analysis, constructed preferably from plastics. In addition, it is useful in any liquid transport device wherein two opposing surfaces are assembled together using an adhesive to bond them together. It is further useful with any materials the surface of which has undesirable wetting characteristics, be they relatively unwettable, such as most plastics, or too wettable, such as glass wherein the equilibrium contact angle for water is about 5°.

As used herein, "adhesive" refers to any material, applied either as a liquid or a pre-coated solid layer, that will cause two surfaces to adhere to each other after proper curing. Because of the nature of the invention, those two surfaces are preferably those used in the preparation of the liquid transport device.

As used herein, "curing" means that sequence of events that is needed to render the adhesive operative to hold surfaces together. The exact steps vary, depending on the adhesive used. (For the preferred adhesives hereinafter enumerated, the curing proceeds by heating the adhesive until it is liquid (if not already at that temperature), and then cooling it until it solidifies.)

Figure 1:
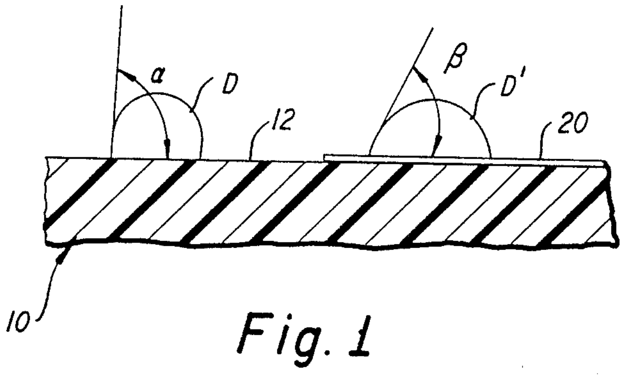
FIG. 1 is a partially schematic illustration of the effect created by the adhesive of this invention, on the equilibrium contact angle of serum, when the adhesive is applied to the underlying plastic support.

Referring now to FIG. 1, the problem of the invention is that liquids to be transported do not readily wet the support material 10 of choice, i.e., plastics such as polystyrene. A drop D of such a liquid, for example, water or serum, if placed on a nominally smooth surface 12 of support material 10, makes an equilibrium contact angle alpha that is, as noted, 87° for water and 83° for serum. This is quite unwettable, and renders difficult the control of liquid spreading over surface 12.

However, when a coating 20 of the adhesive of the invention is formed on such surface 12, the equilibrium contact angle of a drop D' of the same liquid is reduced to angle beta, which is a value of between about 80° and about 30°, most preferably, between 65° and 75°, depending on which adhesive is selected.

As noted, any adhesive is useful if it is capable of bonding the support materials used to form the opposing surfaces of the capillary transport zone, and provides the desired wettability. Preferred are polyester adhesives, particularly those described in U.S. Pat. Nos. 4,352,925; 4,416,965 and 4,140,644. (Thus, particularly preferred are terephthalate polyester adhesives prepared from glycols,) and most particularly those polyesters comprising 30 to 50 mole percent of recurring units derived from diethylene glycol and 50 to 70 mole percent of recurring units derived from ethylene glycol making up the glycol-derived portion of the polyester and 100 mole percent terephthalic acid making up the acid-derived portion of the polyester, although units derived from other acids, especially aromatic and alicyclic acids, and combinations of acids, are also expected to be useful. It is further expected that useful adhesives include the hot melt adhesives of U.S. Pat. No. 4,193,803, and that small amounts of other glycols and acids can be incorporated in the polymers without destroying the required adhesive and wettability properties.

In general, polyesters having recurring units derived from other poly(alkylene glycol) monomers, e.g., triethylene glycol, tetraethylene glycol, dipropylene glycol, tripropylene glycol, etc., and other ether monomers such as the 1,4-bis(2-hydroxyethoxy)cyclohexane of the '803 patent can be partially or fully substituted for the diethylene glycol recurring units of the '925 patent as well as polyimides and polyester imides wherein any of the oxygen atoms in the poly(alkylene glycol) and/or other glycol monomers recurring units are replaced with imine groups, i.e., units derived from imine monomers such as 3,3'-iminobis(propylamine), 2,2'-iminodiethanol, 2,2'-oxybis(ethylamine), 2-(2-aminoethylamino)ethanol, etc. In addition, a percentage of the glycol can be an alkylene glycol other than ethylene glycol, for example, neopentyl glycol, as is described in the aforesaid '644 patent.

A currently preferred adhesive is poly(ethylene-co-2,2'-oxydiethylene (63/37) terephthalate), i.e., as can be obtained under the trademark "Kodabond 5116" adhesive polyester from Eastman Kodak Company. Example 1 of U.S. Pat. No. 4,352,925 illustrates a preparation for this preferred adhesive. The adhesives of the invention all can be prepared by the techniques described in the aforesaid '925 and '803 patents.

Other preferred adhesives include poly(2,2-dimethyl-1,3-propylene-co-2,2'-oxydiethylene (80/20) terephthalate) and poly(2,2-dimethyl-1,3-propylene-co-2,2'-oxydiethylene (50/50) terephthalate).

Another advantage of the aforementioned adhesives is that they coat hydrophobic surfaces without loss of any deliberate surface features.

Figure 2:
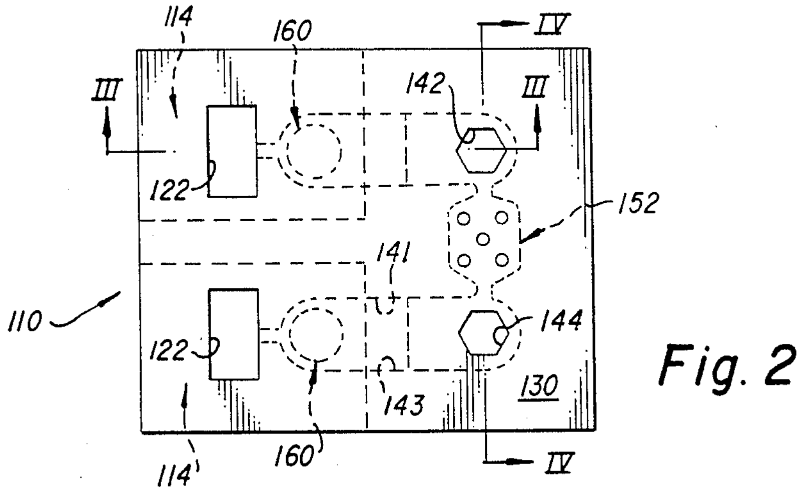
FIG. 2 is a plan view of a useful liquid transport device prepared in accordance with the invention.
Figure 3:
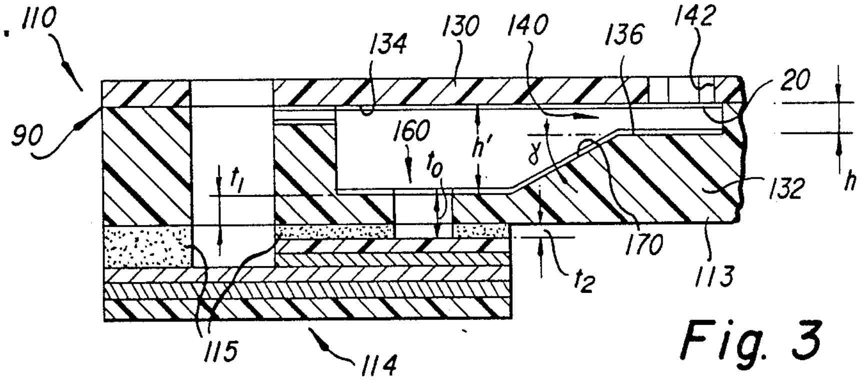
FIG. 3 is a fragmentary section view taken along the line III—III of FIG. 2.
Figure 4:
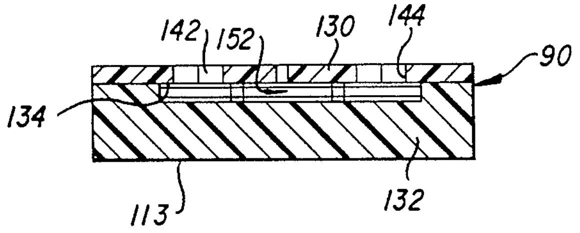
FIG. 4 is a section view taken along the line IV—IV of FIG. 2.

FIGS. 2–4 are representative of the type of capillary liquid transport devices 110 that can be made using this invention. Others will readily be apparent from this example. The device is an ISE test element for potentiometric determination of ionic analytes, using two identical ion-selective electrodes 114 and 114', FIGS. 2 and 3. These are adhered by an adhesive layer 115 to the under surface 113 of a support material 132, FIG. 3. The upper surfaces 136 and 170 of material 132 are part of one of the opposing surfaces that provides the capillary action to move the liquid. The other opposing surface is surface 134 of support material 130, which is joined at interface 90 to support material 132. Liquid access apertures 142 and 144 are provided in material 130, FIGS. 2 and 3. Further details of this device and its use are provided in U.S. Pat. No. 4,473,457, and these are expressly incorporated herein by reference. The capillary spacing of transport zone 140 is then the distance h in the ion bridge portion 152, that expands to h' in the vicinity of apertures 160.

Figure 5:
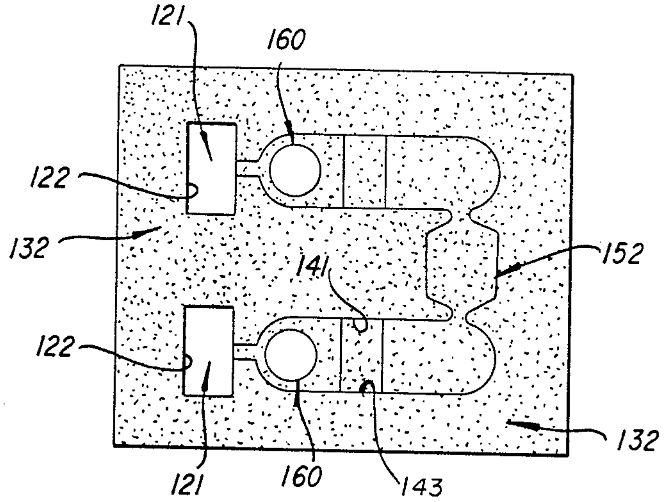
FIG. 5 is a plan view of the bottom member of the device of FIG. 2, illustrating the method of the invention as applied to the device of FIG. 2, wherein the adhesive is applied to the stippled areas.

FIG. 5 illustrates a preferred method of manufacture. The entire exposed surface of support material 132 is coated in a single pass with the adhesive (shown as speckles), so that not only does it occur at the portions that bind to support material 130, but also on the liquid flow surfaces of the transport zone. (Vertically extending surfaces such as 141 and 143 can also be coated, and also surface 122 of apertures 121, or apertures 160, but this is optional.) The other support member 130, FIG. 3, is then joined to member 132 at interface surfaces 90 (FIGS. 3 and 4) and the (adhesive is allowed to cure by cooling to room temperature.)

The dried adhesive coating 20 on the surfaces 136, 170 and 134 of zone 140 then acts to improve the wettability and flow characteristics of zone 140 when liquid (e.g., an aqueous solution or serum) is added. More specifically, the following table illustrates the improvement in the equilibrium contact angle, a standard measure of wettability, on the noted support material, using the adhesives of this invention. The blood serum was a single sample arbitrarily chosen from a normal patient having no known disease condition. The water was deionized water.

Table of Equilibrium Contact Angles

| Coating Material | Support: Polystyrene, When wetted with: Water | Support: Polystyrene, When wetted with: Serum | Support: Glass, When wetted with: Water | Support: Glass, When wetted with: Serum |
|---|---|---|---|---|
| Uncoated-Control | 87° | 83° | 5° | 25.4° |
| Poly[ethylene-co-2,2'-oxydiethylene (63/37) terephthalate] (Extruded) | 72° | 70° | 72°**** | 70°**** |
| Poly[2,2-dimethyl-1,3-propylene-co-2,2'-oxydiethylene (80/20) terephthalate]** | 71–72°*** | N.A. | 71–72°* | — |
| Poly[2,2-dimethyl-1,3-propylene-co-2,2'-oxydiethylene (50/20) terephthalate]** | 71–73°*** | N.A. | 71–73°* | — |

*The variation here depended upon whether the sample was air-dried or oven dried.
**Unlike the first polymer coating of this table, these were prepared for testing by coating a 7.5 wt % solution of the noted polymer in dichloromethane and spin coating onto the support. These coatings were either air dried at room temperature or oven dried for one hour at 50° C. The dichloromethane solvent roughened up the underlying polystyrene, making the contact angle impossible to measure for that material.
***These are assumed to be the same as the values obtained using a glass substrate.
****These are assumed to be the same as the values obtained using a polystyrene substrate.

The values of 70°–73° are adequate for satisfactory flow. Values of 65°–70° are also useful, and actually preferred in some uses.

The adhesive has been shown to be very effective in providing controlled flow of biological liquids, without swelling such as can cause the capillary zone to become plugged. Dimensional tolerances of spacing h and h' and of coating 20 are of no concern, except that the adhesive coating should not completely fill the capillary zone.

Alternatively, not shown, the adhesive can be applied to just one of the two opposing surfaces to improve wettability of just that surface.

Still further, a geometric design (not shown) such as is shown in U.S. Pat. No. 4,618,476 can be coated with the adhesive of this invention to achieve excellent liquid flow properties.

The invention has been described in detail with particular reference to preferred embodiments thereof, but it will be understood that variations and modifications can be effected within the spirit and scope of the invention.

What is claimed is:

1. In a device providing a liquid transport zone for moving liquid along a path by capillary action, said zone comprising opposing surfaces joined together so as to provide a capillary spacing between said surfaces, said surfaces comprising a supporting material having an equilibrium contact angle with serum that is greater than about 80° or less than about 30°, the improvement wherein at least one of said opposing surfaces is coated in at least a portion of said transport zone with an adhesive capable of bonding together said supporting material of said surfaces, said adhesive, when cured, having an equilibrium contact angle with serum that is less than about 80° and greater than about 30°.

2. A device as defined in claim 1, wherein said adhesive is also disposed between said supporting material of said surfaces where they are joined together.

3. A device as defined in claim 1, wherein said cured adhesive provides an equilibrium contact angle with serum that is between about 65° and about 75°.

4. A device as defined in claim 1 or 2, wherein said adhesive comprises an amorphous polyester comprising a glycol and terephthalic acid, having from about 30 to about 50 mole percent of its recurring glycol units being derived from diethylene glycol, and from about 50 to about 70 mole percent of its recurring glycol units being derived from ethylene glycol.

5. A device as defined in claim 4, wherein said adhesive is poly(ethylene-co-2,2'-oxydiethylene terephthalate).

6. A device as defined in claim 1 or 2, wherein said adhesive is selected from the group consisting of poly(ethylene-co-2,2'-oxydiethylene terephthalate), and poly(2,2-dimethyl-1,3-propylene-co-2,2'-oxydiethylene terephthalate).

7. A method of making a device containing a liquid transport zone capable of transporting a patient sample through the zone via capillary action, said zone comprising opposing surfaces joined together so as to provide a capillary spacing between said surfaces, said surfaces comprising a supporting material having an equilibrium contact angle with serum that is outside the range of about 30° to about 80°, the method comprising the steps of (a) providing said supporting material configured with said opposing surfaces;

(b) coating at least a portion of said supporting material of at least one of said surfaces with an adhesive capable of bonding together said supporting material of said surfaces, said adhesive, when cured, having an equilibrium contact angle with serum that is less than about 80° and greater than about 30°, some of the adhesive being applied in at least a portion of the area of said transport zone;

(c) joining said supporting materials; and (d) curing said adhesive.

8. A method as defined in claim 7, and further including the step of applying said adhesive to said supporting material of one of said surfaces at locations designed to contact said supporting material of the other of said surfaces, so that in step (c), said supporting materials are joined together by said adhesive disposed between them.

9. A method as defined in claim 8, wherein said adhesive is applied to said opposing surface and to said contacting locations in a single pass.

10. A method as defined in claim 7 or 8, wherein said adhesive comprises an amorphous polyester of a glycol and terephthalic acid, having from about 30 to about 50 mole percent of its recurring glycol units being derived from diethylene glycol, and from about 50 to about 70 mole percent of its recurring glycol units being derived from ethylene glycol.

11. A method as defined in claim 10, wherein said adhesive is poly(ethylene-co-2,2'-oxydiethylene terephthalate).

12. A method as defined in claim 7, wherein said adhesive is selected from the group consisting of poly(ethylene-co-2,2'-oxydiethylene terephthalate), and poly(2,2-dimethyl-1,3-propylene-co-2,2'-oxydiethylene terephthalate).

* * * * *